United States Patent

[11] 3,602,585

| [72] | Inventors | Theodor Steibl<br>Maisach;<br>Johann Roth, Schwabhausen; Alfred<br>Roppel, Munchen, all of, Germany |
|---|---|---|
| [21] | Appl. No. | 740,306 |
| [22] | Filed | June 26, 1968 |
| [45] | Patented | Aug. 31, 1971 |
| [73] | Assignee | Niezoldi & Kramer GmbH<br>Munich, Germany |
| [32] | Priority | June 27, 1967 |
| [33] | | Germany |
| [31] | | N 30807 |

[54] ADJUSTABLE SHUTTER FOR MOTION PICTURE CAMERAS
15 Claims, 4 Drawing Figs.

[52] U.S. Cl. ..................................................... 352/216, 352/208
[51] Int. Cl. ..................................................... G03b 9/10
[50] Field of Search........................................... 352/208, 209, 214, 216, 217

[56] References Cited
UNITED STATES PATENTS

| 1,965,366 | 7/1934 | Brown.......................... | 352/209 |
| 2,445,288 | 7/1948 | Broido et al. ................. | 352/216 |
| 3,232,690 | 2/1966 | McKee et al.................. | 352/216 X |
| 3,303,271 | 2/1967 | Hecker......................... | 352/208 X |
| 1,873,742 | 8/1932 | Debrie.......................... | 352/216 |
| 2,672,073 | 3/1954 | Bolsey.......................... | 352/216 |

Primary Examiner—John M. Horan
Assistant Examiner—Alan Mathews
Attorney—Michael S. Striker ABSTRACT: A motion picture camera with an adjustable rotary shutter 3 wherein the angular position of one (20) of two shutter blades (13, 20) with reference to the other blade (13) can be changed by a lever (27) which engages a part (23) rotating with the shutter (3) only when the user wishes to change the exposure time. A spring (24) causes the blades (13, 20) to furnish an optimum exposure time for normal operation of the camera whenever the lever (27) is disengaged from the rotary part (23).

INVENTORS
THEODOR STEIBL
JOHANN ROTH
ALFRED ROPPEL

BY Michael S.Striker
ATTORNEY

ADJUSTABLE SHUTTER FOR MOTION PICTURE CAMERAS

BACKGROUND OF THE INVENTION

The present invention relates to motion picture cameras, and more particularly to improvement in motion picture cameras which are equipped with adjustable shutters. Such adjustable shutters are provided in cameras which can be operated to produce fade-in and fadeout effects.

In conventional motion picture cameras, the shutter is adjustable by means of a manually operated actuating member which is in permanent engagement with the shutter. As a rule, the shutter comprises two blades having hubs one of which is rotatably telescoped into the other hub. The outer hub carries an axially movable sleeve which is coupled to a manually operated actuating member and can change the angular position of that blade which is rigid with the outer hub with reference to the other blade. The sleeve rotates the outer hub by way of a cam and groove connection. In this way, the operator can change the exposure time by changing the size of the aperture which is defined by the blades. A drawback of such conventional adjustable shutters is that the manually operated actuating member is in permanent engagement with the revolving sleeve whereby the resulting friction affects the accuracy at which the shutter is rotated by the camera motor. The friction is generated with considerable expenditures in electrical or other energy. Moreover, the sleeve and the actuating member undergo extensive wear.

SUMMARY OF THE INVENTION

One of the objects of the present invention is to provide a motion picture camera with a novel and improved adjustable shutter whose parts are subjected to negligible wear when the shutter operates normally and wherein the means for adjusting the shutter undergoes additional wear only when the operator decides to change the exposure time.

Another object of the invention is to provide an adjustable shutter which can be built into many types of known motion picture cameras and which enables the operator to produce shorter- or longer-lasting fade-in and fadeout effect in a very simple way.

A further object of the invention is to provide an adjustable shutter wherein the blades automatically assume positions which are best suited for normal operation of the motion picture camera and wherein the blades can select a practically unlimited number of exposure times.

The improved camera comprises rotary shutter means including a pair of coaxial shutter blades normally defining an aperture of predetermined size, e.g., corresponding to an exposure time of one-thirtieth of a second, one of the blades being rotatable with reference to the other blade from an end position in which the blades define the aforementioned aperture of predetermined size, adjusting means rotatable with the shutter means and actuatable to rotate the one blade from its end position, and actuating means for the adjusting means. The actuating means is disengaged from the adjusting means in the end position of the one blade so that no friction develops between such actuating means and the adjusting means unless the user of the camera decides to change the aperture size. The adjusting means preferably comprises means for biasing the one blade to its end position. Furthermore, the adjusting means comprises a device for rotating the one blade from its end position in response to motion received from the actuating means. Such device includes a pin or the like which serves to transmit torque from the other blade to the one blade regardless of whether the actuating means engages with or us disengaged from the adjusting means.

The novel features which are considered as characteristic of the invention are set forth in particular in the appended claims. The improved shutter itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
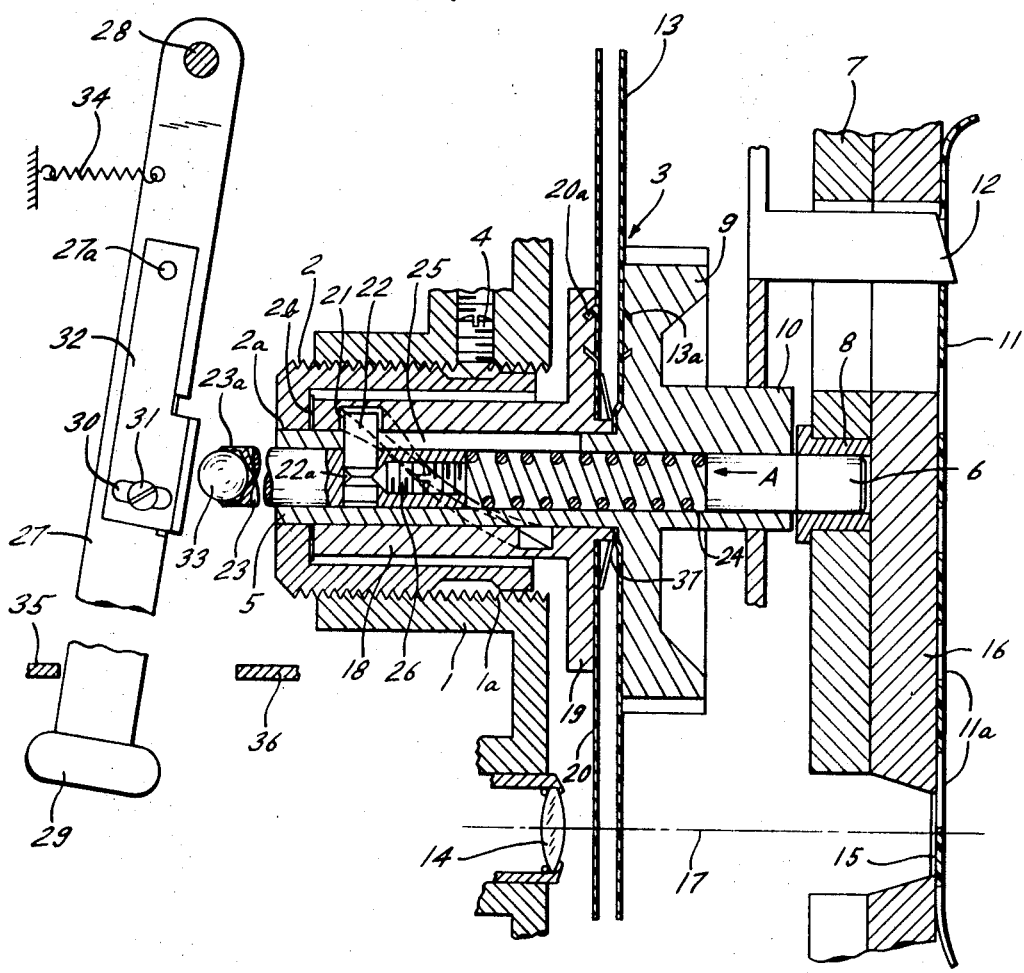
FIG. 1 is a fragmentary sectional view of a motion picture camera having an adjustable shutter which embodies the present invention.

Referring first to FIG. 1, there is shown a portion of a motion picture camera which includes a body or housing comprising or mounting a tubular support 1 having internal threads 1a which mesh with external threads provided on a bearing sleeve 2. The sleeve 2 is movable axially in response to rotation with reference to the support 1 and can be fixed in a selected axial position by a radial lock screw 4 which meshes with the support 1. The left-hand end wall 2a of the sleeve 2 provides a bearing for a first rotary tubular carrier or hub 5 which forms part of an adjustable rotary shutter 3. The right-hand end portion of the hub 5 is rigid with a shaft 6 which extends into a cupped bearing member 8 installed in a wall 7 of the camera body. The drive means for rotating the shutter 3 comprises a gear 9 which is integral with or is rigidly connected to the hub 5 and receives motion from a motor, not shown, through a suitable transmission of any known design. An eccentric 10 which is integral with the gear 9 and/or hub 5 serves to operate the film transporting mechanism of the camera here shown as including a reciprocable pulldown 12 whose claw can penetrate into perforations 11a of motion picture film 11 to advance the latter in stepwise fashion.

The hub 5 is rigid with a first arcuate shutter blade 13 having projections 13a which are anchored in one face of the gear 9. In normal operation of the camera, the blade 13 determines the amounts of light which can reach an unexposed frame of the film 11 between successive advances of the film under the action of the pulldown 12. Such light is focused by an objective 14 and passes through a cutout 13b of the blade 13 (FIG. 2b) and through an opening 15 defined by a film guide 16 which is located behind the wall 7. The optical axis of the objective 14 is shown at 17. The operation of the shutter 3 is synchronized with operation of the pulldown 12 in such a way that the blade 13 extends across the opening 15 and prevents exposure of film 11 when the pulldown 12 performs a working stroke to advance the film by the length of a frame.

The shutter 3 further comprises a second rotary tubular carrier or hub 18 which is rotatably mounted on the hub 5 and has a flange 19 receiving projections 20a of a second arcuate shutter blade 20. Adjusting means is provided for rotating the hub 18 and blade 20 with reference to the hub 5 and blade 13; in the present instance, the blade 20 is rotatable through 180° with reference to the blade 13 to thereby change the size of the aperture which is defined by the cutouts 13b, 20b of the two blades. If desired, each of the blade 13, 20 can form an integral part of the respective hub; such blades and their hubs can be produced by injection molding from suitable synthetic plastic material.

The aforementioned adjusting means for the blade 20 comprises a helical cam groove 21 which is machined into the internal surface of the hub 18 and receives a radial torque transmitting pin 22 which forms part of a follower assembly further including a plunger 23 which is reciprocable in the central passage of the hub 5. A strong helical spring 24 is inserted between the shaft 6 and plunger 23 to bias the latter in a direction to the left, as viewed in FIG. 1, to an end position in which the pin 22 extends into the left-hand end of the cam groove 21 to thereby maintain the blade 20 in a first end position with reference to the blade 13. The arrow A indicates the direction in which the plunger 23 is biased by the spring 24. An intermediate portion of the pin 22 extends across an elongated axially parallel slot 25 of the hub 5. The means for holding the pin 22 against axial movement (radially of the plunger 23) comprises a screw 26 having a conical tip which extends into a circumferential groove 22a of the pin 22. The screw 26 is threaded into an axially extending tapped bore of the plunger 23.

Figure 2A:
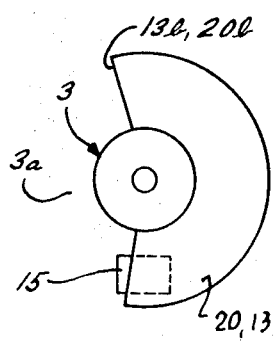
FIG. 2a is a smaller scale schematic front elevational view of shutter blades in a first position of adjustment.

The angular position of the blade 20 with reference to the blade 13 can be changed in response to axial displacement of the plunger 23 in opposition to bias of the spring 24. The actuating means for effecting such adjustments by way of the adjusting means 21–23 includes a lever 27 which is mounted on a pivot pin 28 in the camera body and has a handgrip portion or knob 29 which extends through an opening in the camera body and can be moved into abutment with one of two spaced stops 35, 36. These stops can be provided on or they can form part of the camera body. The lever 27 carries an adjustable motion transmitting member 32 which is movable into engagement with a ball 33 installed in a cage 23a inserted into that end portion of the plunger 23 which extends from the hub 5. The lever 27 is provided with a pivot pin 27a for the motion transmitting member 32 and the latter has a transverse slot 30 for the stem of an arresting screw 31. When the screw 31 is driven home, the position of the member 32 with reference to the lever 27 is fixed. A return spring 34 biases the lever 27 into abutment with the stop 35. When the operator releases the knob 29, the spring 34 automatically returns the lever 27 to the illustrated position in which the motion transmitting member 32 is remote from the ball 33 so that rotation of the shutter 3 is not affected by the actuating means. The spring 24 then maintains the pin 22 of the adjusting means in the illustrated position in which the cutout 20b of the blade 20 registers with the cutout 13b of the blade 13 (see FIG. 2a). In other words, the aperture defined by the blades 13, 20 has a maximum size which corresponds to that of the cutout 13b or 20b. A dished spring 37 is interposed between the radially innermost portions of the blades 13, 20 and serves to prevent wobbling of the hub 20 axially of the hub 5. The bias of this spring 37 is felt when the bearing sleeve 2 is rotated in a sense to move its internal shoulder 2b in a direction away from the blades 13, 20. The shoulder 2b constitutes an abutment for the hub 18 which is biased against this shoulder by the spring 37. By rotating the sleeve 2, the operator can adjust the bias of the spring 37 and the axial clearance between the shutter blades 13, 20.

Figure 2B:
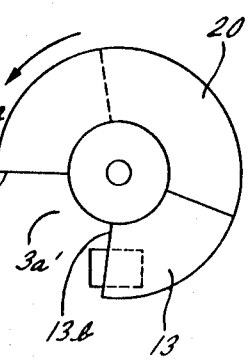
FIG. 2b is a similar schematic front elevational view but showing the blades in a different position of adjustment.

If the operator wishes to change the size of the aperture 3a (FIG. 2a), i.e., to reduce such size to that shown in FIG. 2b as at 3a', the knob 29 is grasped by hand to pivot the lever 27 in a counterclockwise direction so that the motion transmitting member 32 engages the ball 33 and depressed the plunger 23 against the opposition of the spring 24. The pin 22 travels in the axially parallel slot 25 of the hub 5 and in the helical groove 21 of the hub 18 whereby the latter turns with reference to the hub 5 and changes the angular position of the blade 20, for example, to the extent shown in FIG. 2b. The lever 27 can be pivoted while the camera is in use whereby the camera produces a fadeout effect by reducing the amounts of light which can reach the film 11 during each revolution of the shutter 3.

Figure 2C:
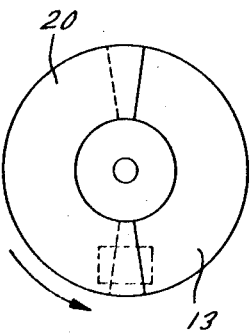
FIG. 2c illustrates the structure of FIG. 2b but in a third position of adjustment.

The shutter 3 is closed completely (see FIG. 2c) when the lever 27 abuts against the stop 36. The cutout 20b of the blade 20 is then out of registry with the cutout 13b of the blade 13. The motor of the camera can be arrested prior to or simultaneously with release of the knob 29 so that the filming of a scene is completed with a fadeout effect. If the user wishes to produce a fade-in effect immediately following completion of the fadeout effect, the lever 27 is released gradually so that it wanders from the stop 36 toward the stop 35 and enables the spring 24 to gradually return the pin 22 into the left-hand end of the helical cam groove 21. An experienced operator can readily control the speed at which the lever 27 is moved between the stops 35, 36 to thereby determine the duration of the fadeout and the fade-in effects as well as to insure gradual transition between complete closing and full opening of the shutter.

The direction and lead of the helical cam slot 21 are preferably selected in such a way that the hub 18 and shutter blade 20 can rotate by inertia with reference to the hub 5 and shutter blade 13 when the latter is arrested by the gear 9 in response to stoppage of the camera motor. In this way, the blade 20 can reduce the size of the aperture from 3a toward or all the way to or even beyond 3a' when the motor is arrested, i.e., a portion of the shutter 3 (namely, the blade 20 and its hub 18) can dissipate energy without striking against a fixed stop. This is particularly desirable when the camera is used to make individual shots of or for slow-motion photography.

An important advantage of the improved shutter is that its parts are not in frictional engagement with the actuating means 27, 32 when the shutter furnishes an exposure time e.g. one-thirtieth of a second) which is best suited for normal operation of the motion picture camera. When the motion transmitting member 32 is disengaged from the ball 33, some negligible friction develops only between the hub 5 and bearing 2a on the one hand and shaft 6 and bearing 8 on the other hand. Furthermore, additional friction which develops on movement of the member 32 against the ball 33 is minimal because the ball is free to rotate in the cup 23a of the plunger 23. The member 32 is in mere point contact with the ball 33.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. In a photographic apparatus, a combination comprising rotary shutter means including two coaxial shutter blades normally defining an aperture of predetermined size, one of said blades being rotatable with reference to the other blade from an end position in which the blades define said aperture of predetermined size, and two coaxial hubs one of which is rigid with said one blade and the other of which is rigid with said other blade and is rotatable in said one hub, said other hub having an axially parallel slot; drive means for rotating said other hub; adjusting means rotatable with said shutter means and actuatable to rotate said one blade from said end position, said adjusting means including a plunger movable axially of said other hub and a cam and follower assembly connecting said plunger for rotation to said other hub and arranged to turn said one hub and said one blade from said end position in response to axial movement of said plunger, said cam and follower assembly comprising a follower rigid with said plunger and extending radially through and beyond said slot and a helical cam groove provided in said one hub and receiving a portion of said follower; and actuating means for said adjusting means, said actuating means being disengaged from said adjusting means in said end position of said one blade and including means for moving said plunger from a position corresponding to said end position of said one blade.

2. A combination as defined in claim 1, wherein said adjusting means further comprises means for permanently biasing said plunger to a predetermined position corresponding to said end position of said one blade.

3. A combination as defined in claim 2, wherein said drive means is arranged to rotate said other hub in a predetermined direction, said one blade being rotatable by inertia from said end position against the opposition of said biasing means on stoppage of said other blade.

4. A combination as defined in claim 1, wherein said blades comprise portions which are anchored in the respective hubs.

5. A combination as defined in claim 4, wherein said drive means comprises a portion which is integral with said other hub.

6. A combination as defined in claim 1, wherein said blades and the respective hubs consist of synthetic plastic material.

7. A combination as defined in claim 1, wherein said blades are integral with the respective hubs.

8. In a photographic apparatus, a combination comprising rotary shutter means including two coaxial shutter blades normally defining as aperture of predetermined size, one of said blades being rotatable with reference to the other blade from an end position in which the blades define said aperture of predetermined size, and two coaxial hubs one of which is rigid with said one blade and the other of which is rigid with said other blade and is rotatable in said one hub; drive means for rotating said other hub; adjusting means rotatable with said shutter means and actuatable to rotate said one blade from said end position, said adjusting means including a plunger movable axially of said other hub and a cam and follower assembly connecting said plunger to said other hub and arranged to turn said one hub and said one blade from said end position in response to axial movement of said plunger; actuating means for said adjusting means, said actuating means being disengaged from said adjusting means in said end position of said one blade and including means for moving said plunger from a position corresponding to said end position of said one blade, said actuating means further including a lever pivotable with reference to the body of said apparatus about a fixed axis and spring means for biasing said lever away from said plunger; and stop means for arresting said lever in a preselected position against the opposition of said spring means.

9. A combination as defined in claim 8, wherein said lever is pivotable by hand from said preselected position to thereby move said plunger axially of said other hub, and further comprising second stop means for arresting said lever in a second preselected position corresponding to a second end position of said one blade with reference to said other blade.

10. A combination as defined in claim 9, wherein said blades define an aperture of minimum size in the second end position of said one blade.

11. A combination as defined in claim 10, wherein the size of said aperture in the second end position of said one blade is zero.

12. A combination as defined in claim 8, wherein said actuating means further comprises a motion transmitting member and means for adjustably securing said motion transmitting member being arranged to engage and to move said plunger axially through the intermediary of an antifriction bearing in response to movement of said lever away from said preselected position.

13. In a photographic apparatus, a combination comprising rotary shutter means including two coaxial shutter blades normally defining an aperture of predetermined size, one of said blades being rotatable with reference to the other blade from an end position in which the blades define said aperture of predetermined size, ad two coaxial hubs one of which is rigid with said one blade and the other of which is rigid with said other blade and is rotatable in said one hub; bearing means rotatably receiving said one hub and having abutment means for said one hub; means for biasing said one hub axially against said abutment means; drive means for rotating said other hub; adjusting means rotatable with said shutter means and actuatable to rotate said one blade from said end position, including a plunger movable axially of said one hub and a cam and follower assembly connecting said plunger for rotation to said other hub and arranged to turn said one hub and said one blade from said end position in response to axial movement of said plunger; and actuating means for said adjusting means, said actuating means being disengaged from said adjusting means in said end position of said one blade and including means for moving said plunger from a position corresponding to said end position of said one blade.

14. A combination as defined in claim 13, further comprising support means for said bearing means, said bearing means being adjustable with reference to said support means in the axial direction of said hubs.

15. A combination as defined in claim 14, wherein said support means comprises a tube having internal threads meshing with external threads provided on said bearing means.